2,716,478

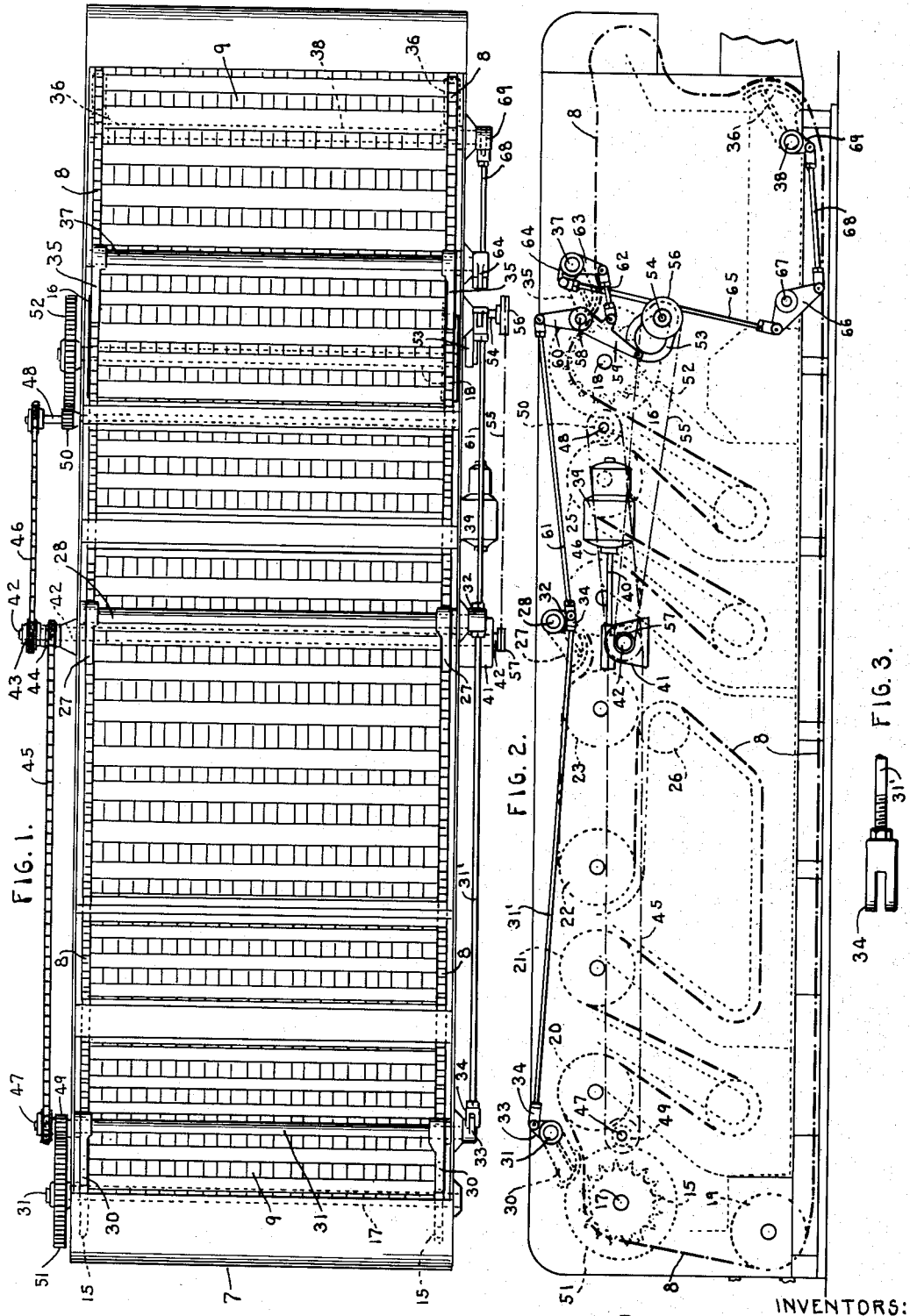
Aug. 30, 1955   F. W. WEHMILLER ET AL   2,716,478
CONVEYORS
Filed July 2, 1951   2 Sheets-Sheet 1
INVENTORS:
FREDERICK W. WEHMILLER
JAMES L. HEROLD
ATTORNEYS Aug. 30, 1955  F. W. WEHMILLER ET AL  2,716,478
CONVEYORS
Filed July 2, 1951  2 Sheets-Sheet 2
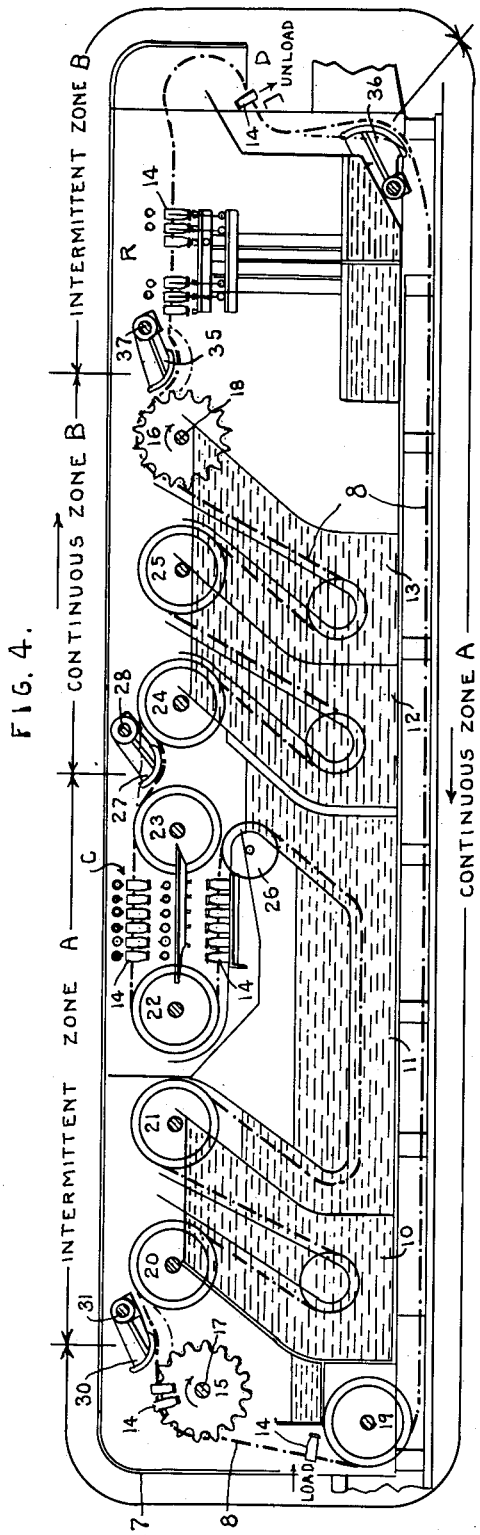
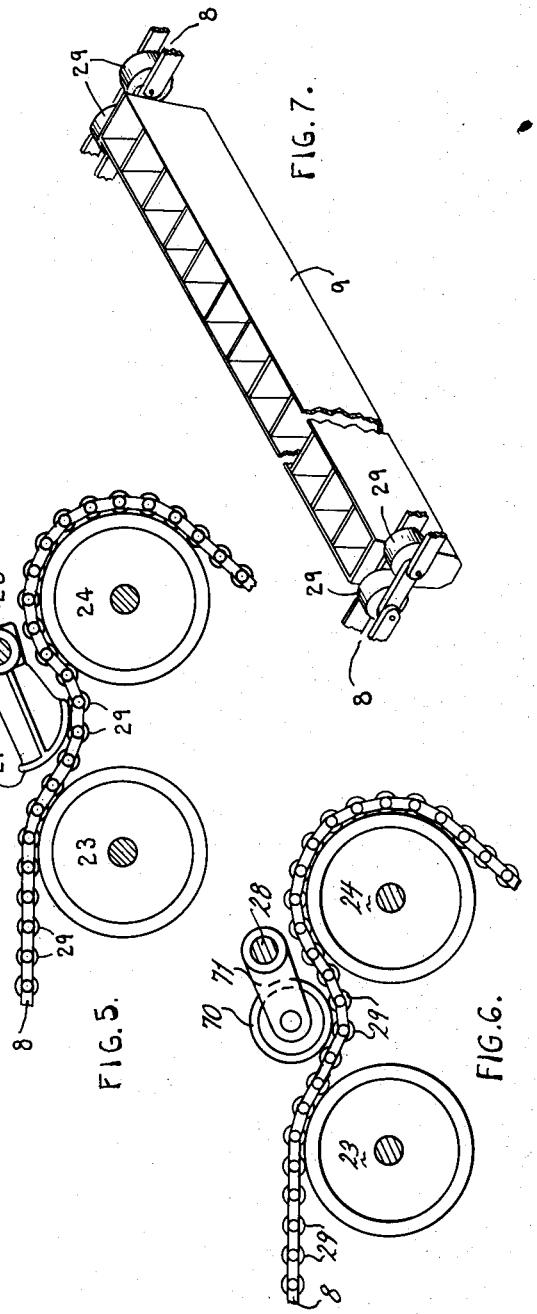
INVENTORS:
FREDERICK W. WEHMILLER
JAMES L. HEROLD
BY
*Carr & Carr & Gravely*
ATTORNEYS ns Patent Office
2,716,478
Patented Aug. 30, 1955

CONVEYORS

Frederick W. Wehmiller, St. Louis County, and James L. Herold, St. Louis, Mo., assignors to Barry-Wehmiller Machinery Company, St. Louis, Mo., a corporation of Missouri Application July 2, 1951, Serial No. 234,693

12 Claims. (Cl. 198—19)

This invention relates to conveyors, and more particularly to a flexible endless conveyor having continuously moving portions and intermittently movable portions. Various advantages are obtainable from an endless conveyor of this type. For example, it may travel through a zone where intermittent movements are desired for successive operations on articles carried by the conveyor, and also through a zone where a continuous movement is desired.

In the usual type of intermittent conveyor, the entire conveyor is stopped and started at frequent intervals under conditions requiring excess energy for the starting movements, when the transmission of power must overcome the inertia involved in starting the entire conveyor. This is especially true in the operation of a large, heavy endless conveyor having long, heavy portions which are idly stopped and started, merely because other portions of the conveyor require an intermittent movement. The new continuous-intermittent conveyor eliminates such power losses, as well as the more or less destructive shocks resulting from idly stopping and starting the heavy conveyor elements in zones where a continuous movement is preferable.

In addition to the simplicity of merely employing a single endless conveyor for continuous and intermittent movements, the present invention provides for effective mechanical controls of the flexible conveyor elements in the intermittent zone, so as to accurately produce the predetermined step by step movements. For example, the endless conveyor may be long enough to provide for accumulation of excess slack at the entrance of an intermittent zone, immediately beyond a constantly rotating drive wheel; and at the opposite end (exit end) of said intermittent zone we preferably employ bending members which move transversely of the path of the flexible conveyor so as to forcibly bend, or depress, portions of the conveyor and withdraw corresponding portions of the accumulated slack from the entrance of the intermittent zone. The bending members are movable back and forth predetermined distances to form predetermined bends in the conveyor, thereby imparting predetermined longitudinal movements to portions of the conveyor in the intermittent zone.

We will also refer to convenient adjustments for varying the effective bending action of the bending members for predetermined degrees of intermittent movements. A substantial saving of mechanical energy can be gained by employing bending members in the form of constantly oscillating shoes having curved faces which contact with large rollers in the flexible conveyor, so as to forcibly depress the rollers during the intermittent movements, and then rise with the rollers while the deliberate bend is being withdrawn from the conveyor.

The bending members at the exit end of the intermittent zone are synchronized with the driving wheels which impart a continuous motion to sections of the conveyor beyond said intermittent zone.

The mechanism may also include restraining members at the entrance of the intermittent zone, movable into the loop or bend formed by excess slack which accumulates at said entrance, and also movable out of said loop or bend as the slack is withdrawn, thereby guiding and restraining the loose slack sections, so as to insure smooth, predetermined intermittent movements, not affected by momentum or jerking at said slack sections.

Each bending member is preferably oscillated in the course of the conveyor between an idle supporting wheel and a constantly rotating toothed drive wheel, said wheels forming supports for conveyor sections at opposite sides of the arcuate path of the bending member, and the direction of the bending movement is preferably toward an adjacent continuous zone, so that the bending movement will have a tendency to advance the conveyor in the direction of the continuous movement. Under these conditions, the toothed drive wheel positively prevents retrograde movement of conveyor sections in the adjacent continuous zone, and the movement of the bending member toward said continuous zone tends to avoid excessive loads at said drive wheel.

To illustrate one form of the invention, we have shown an endless bottle carrier provided with two intermittent zones in the course of the conveyor, but the novel conditions may be employed for one or more intermittent zones.

With the foregoing and other objects in view, the invention comprises the novel combination and arrangement of details herein shown and described for one form of the continuous-intermittent conveyor. However, it is to be understood that the scope of the invention extends to variations and modifications more broadly described by the claims hereunto appended.

In the accompanying drawings:

Fig. 1 is a diagrammatical top or plan view of a bottle-cleansing machine equipped with a conveyor embodying features of this invention.

Fig. 2 is a diagrammatical side view, with the course of the endless conveyor shown by relatively heavy dot and dash lines.

Fig. 3 is a detail view showing an adjustable member at one end of a connecting rod.

Fig. 4 is a diagrammatical longitudinal section wherein the course of the endless conveyor is indicated by dot and dash lines, the bottle holders being omitted.

Fig. 5 is a fragmentary view, drawn to a larger scale, showing one of the bending members movable transversely of the flexible conveyor to forcibly bend portions of the conveyor, and thereby drive sections of the conveyor in an intermittent zone.

Fig. 6 is an enlarged fragmentary view of a modified bending member of roller type as distinguished from the shoe type shown in Fig. 5.

Fig. 7 is a detail view of one of the transverse bottle carriers having its ends connected to sprocket chains at opposite sides of the conveyor.

As an illustration of a desirable form of the invention, the drawings diagrammatically show a bottle-cleansing machine including a housing 7 and endless sprocket chains 8 at opposite sides of the housing, the course of said chains being shown diagrammatically by dot and dash lines. In this form of the invention, there are numerous transverse bottle carriers 9 having their ends connected to the sprocket chains 8, as suggested in Figures 1 and 7. The chains 8 and bottle carriers 9 travel downwardly and upwardly through successive soaking compartments 10, 11, 12 and 13 shown in Fig. 4, wherein the bottles are soaked in suitable liquids to facilitate the cleansing operations.

At the upper portion of Fig. 4 we have diagrammatically shown a cleansing station C where rows of bottles 14 in the bottle carriers 9 are to be subjected to successive streams of cleansing liquid, and a rinsing station R where the bottles are to be rinsed by successive streams of clean liquid. At these cleansing and rinsing stations, the conveyor is to be moved intermittently, step by step, with intervals of rest between the steps, so as to successively aline the bottles with the streams of liquid during the intervals of rest. The cleansing and rinsing stations C and R are shown diagrammatically, merely to illustrate a condition wherein the intermittent movements are desirable, it being understood that the new continuous-intermittent conveyor may be employed in any type of machine wherein its functions are advantageous.

In Fig. 4 descriptive words are employed to indicate intermittent and continuous zones in the course of the endless conveyor. The intermittent zone A includes the cleansing station C, while the intermittent zone B includes the rinsing station R as well as a discharge station D where the bottles 14 are unloaded from the conveyor.

In a commercial machine suitable tracks and wheels are employed to support and guide the endless conveyor, and such elements may be arranged in any desired manner. The supporting and guiding wheels shown in Fig. 4 include toothed sprocket wheels 15 and 16 on shafts 17 and 18, respectively, which are constantly driven to impart a continuous movement to portions of the sprocket chains 8 in the continuous zones A and B. Idle wheels 19 to 26, inclusive, are shown to support and guide the flexible endless conveyor. A suitable means for transmitting power to the sprocket wheels and other devices synchronized therewith will be hereinafter described.

It is to be understood that the sprocket chains 8 are long enough to provide for accumulations of slack at selected portions of the chains. For example, at the entrance of the intermittent zone A in Fig. 4, slack will accumulate between the toothed driving wheel 15 and the idle wheel 20, and also immediately beyond the toothed driving wheel 16, while portions of the chains in the intermittent zones are at rest.

Attention is now directed to devices which withdraw the slack to drive the chain sections in the intermittent zones.

A bending member 27 at the exit of the intermittent zone A (Fig. 4) is movable transversely of the flexible conveyor to forcibly bend portions of the conveyor and withdraw corresponding portions of the slack from the space between the wheels 15 and 20 at the entrance of said intermittent zone. Fig. 1 shows that there are two bending members 27 fixed to opposite ends of a transverse shaft 28, so as to lie directly above the sprocket chains 8 at opposite sides of the machine. To reduce the power requirements, each sprocket chain 8 is provided with relatively large anti-friction rollers 29, and each bending member 27 is in the form of an oscillatory shoe having a curved surface adapted to contact with a plurality of the rollers 29 (Fig. 5) during the bending operations, while the contact surface of the shoe moves away from the adjacent intermittent zone, in accordance with the direction of movement of the chain.

At the entrance of the intermittent zone A, Fig. 4 shows an oscillatory restraining member 30 movable into the loop or slack which accumulates at said entrance, and also movable out of the loop as the slack is withdrawn by the bending member 27 at the exit of said intermittent zone A, thereby restraining and guiding the loose chain sections, so as to insure smooth, predetermined intermittent movements, not affected by momentum or jerking at the slack sections. Fig. 1 shows that there are two restraining members 30, one at each end of a transverse oscillatory shaft 31.

Attention is now directed to a means for connecting the oscillatory members 27 and 30 which lie at opposite ends of the intermittent zone A. Figures 1 and 2 show a connecting rod 31' having one of its ends pivoted to an arm 32 extending downwardly from the oscillatory shaft 28 which carries the bending shoes 27, and its opposite end pivoted to an arm 33 extending upwardly from the shaft 31 carrying the restraining members 30. Each end of said connecting rod 31' is provided with a clevis 34 screwed onto the rod (Fig. 3), so as to provide for adjustments of the oscillatory shoes 27 and 30. In this manner, the shoes 27 and 30 can be readily adjusted for most effective cooperation in forcibly bending the flexible chains 8 while releasing the accumulated slack. It will also be understood that in assembling the details, the shoes 27 and 30 can be adjusted in arcuate paths around their respective shafts, so as to provide selected spaces between the shoes and conveyor chains when said shoes occupy their highest positions. This will predetermine the effective strokes of the shoes while they are in contact with the chains.

Study of Fig. 2 will show that the bending shoes 27 move downwardly to withdraw the slack, while the restraining shoes 30 move upwardly to release corresponding portions of the slack during the intermittent movements.

Similar conditions appear in the intermittent zone B at the right hand end of Fig. 4. Slack accumulates at the entrance of this zone, immediately beneath restraining shoes 35, and is intermittently withdrawn by means of bending shoes 36 at the exit of said zone. The restraining shoes 35 are carried by opposite ends of an oscillatory shaft 37 (Fig. 1) while the bending shoes 36 appear at opposite ends of an oscillatory shaft 38. It is to be understood that the restraining shoes 35 move downwardly to follow the slack and upwardly to release the slack when it is withdrawn by downward and outward movements of the bending shoes 36. Each of these shoes has a curved surface adapted to contact with the large rollers 29 (Fig. 5) on the sprocket chains 8.

To illustrate a suitable means for transmitting power to the constantly rotating sprocket wheels 15 and 16 and the oscillatory bending and restraining shoes under conditions that synchronize the several different movements, Figures 1 and 2 diagrammatically show an electric motor 39 as the source of power, said motor having a drive shaft 40 leading to a gear housing 41 provided with a driven shaft 42 which extends across the machine, as shown by dotted lines in Fig. 1. To illustrate a means for transmitting power to the constantly rotating sprocket wheels 15 and 16, Fig. 1 diagrammatically shows sprocket wheels 43 and 44 on the driven shaft 42, sprocket chains 45 and 46 for the transmission of power from said sprocket wheels 43 and 44 to similar wheels on countershafts 47 and 48, the latter being provided with pinions 49 and 50 meshing with large gear wheels 51 and 52 on the shafts 17 and 18 of the constantly driven sprocket wheels 15 and 16, respectively.

The means for transmitting power to the oscillatory bending and restraining shoes is also shown diagrammatically in Figures 1 and 2, wherein 53 designates a constantly rotating cam on a shaft 54, said shaft being driven by an endless belt 55 which may be in the form of a sprocket chain extending from a wheel 56 on the cam shaft 54 to a wheel 57 on the driven shaft 42. The cam 53 may be employed to constantly oscillate a lever fulcrumed at 58, said lever having an arm 59 extending downwardly to the cam 53 and an upper arm 60 pivoted to a connecting rod 61 which extends to the arm 32 of the shaft 28 for the bending shoes 27. As previously indicated, this arm 32 is connected to an arm 33 on the shaft 31 which carries the restraining shoes 30. Under these conditions, the shoes 27 and 30 are constantly oscillated in synchronism with each other, the bending shoes 27 being moved downwardly to drive the chains in an intermittent zone, while the shoes 30 move upwardly to release slack portions of said chains.

The cam lever arm 59 (Fig. 2) is connected by means of a rod 62 to an operating arm 63 depending from the shaft 37 of the restraining shoes 35, so as to oscillate said shoes. The shaft 37 is also provided with an arm 64 connected by means of a rod 65 to a bell-crank lever 66 fulcrumed at 67 (Fig. 2), and this lever 66 is connected by means of a rod 68 to an arm 69 on the shaft 38 which carries the oscillatory bending shoes 36. The restraining shoes 35 are thus synchronized with the bending shoes 36, so as to release slack portions of the chains 8 during the forcible bending movements of the shoes 36.

The foregoing described machine may be modified by incorporating the means shown in Fig. 6 for the members of the type shown at 27 in Figs. 4 and 5. The modified bending member consists of a roller or revolving shoe 70 carried by the oscillating arm 71 fixed to shaft 28. The oscillatory shoe 70 operates substantially as does the shoe 27 (Fig. 5) but there is considerably less resistance to movement of the conveyor 8 between the wheels 23 and 24. The use of revolving shoes is not limited to applications on shaft 28, as it may be used in other locations to assist in reducing frictional loads.

What is claimed is:

1. In a flexible endless conveyor having continuously moving portions and intermittently movable portions, constantly rotating drive wheels for said continuously moving portions, the conveyor forming a closed circuit being long enough to provide for accumulation of excess slack in sections of the conveyor at the entrance of intermittent portions, bending members mounted for pivoting movement transversely of the flexible conveyor at the exit of each of said intermittent portions to forcibly bend the conveyor and withdraw corresponding portions of the accumulated slack, said bending members being pivoted back and forth predetermined distances to form predetermined transverse bends in the conveyor, thereby imparting predetermined longitudinal movements to the intermittent portions of the conveyor, conveyor slack restraining members movable into and out of bends formed by the slack at said entrance sections, so as to guide and restrain the loose slack portions, and a power transmission device connecting said pivoted bending members to said restraining members, so as to synchronize the movements of said bending and restraining members.

2. In a flexible endless conveyor having continuously moving portions and intermittently movable portions in a zone between said continuously moving portions, constantly rotating drive wheels for said continuously moving portions, the conveyor forming a closed circuit and being long enough to provide for accumulation of slack in sections of the conveyor between the continuously moving portions and the entrance of the intermittent zone, bending members mounted for pivoting movement transversely of the flexible conveyor at the exit of said intermittent portions to forcibly bend portions of the conveyor and withdraw corresponding portions of the accumulated slack, said bending members being movable back and forth predetermined distances to form predetermined bends in the conveyor, thereby imparting predetermined intermittent movements to the conveyor in the intermittent zone, and constantly operating power mechanism connected with said drive wheels and including a connection for the bending members, and means for adjusting said last mentioned connection to vary the effective bending action of the bending members for predetermined degrees of intermittent movements.

3. A flexible endless conveyor comprising endless sprocket chains at opposite sides of the conveyor, transverse carriers connected to said sprocket chains, constantly rotating sprocket wheels meshing with said chains to impart a continuous traveling movement to portions of the conveyor, other portions of the conveyor being movable intermittently through an intermittent zone between said continuously traveling portions, the sprocket chains forming a closed circuit and being long enough to provide for accumulations of slack at the entrance of the intermittent zone, and oscillatory bending members having curved contact surfaces movable back and forth transversely of the sprocket chains at the exit of said intermittent zone, so as to forcibly bend continuously traveling portions of chains and withdraw corresponding portions of the accumulated slack, thereby imparting intermittent movements to the portions of the conveyor in the intermittent zone, the slack produced by the forcible action of said bending members being withdrawn by the adjacent continuously traveling portions of the chains during the return strokes of the bending members, and rotary supporting wheels located in fixed positions beneath the sprocket chains at opposite sides of said oscillatory bending members, the supporting wheel at one side of a bending member being in contact with continuously traveling portions of the conveyor, while the wheel at the opposite side contacts with intermittently movable portions.

4. A flexible endless conveyor comprising endless sprocket chains at oppostie sides of the conveyor, said chains including link sections provided with rollers, constantly rotating sprocket wheels meshing with said chains to impart a continuous traveling movement to portions of the conveyor, other portions of the conveyor being movable intermittently through an intermittent zone between said continuously traveling portions, the sprocket chains forming a closed circuit and being long enough to provide for accumulation of slack at the entrance of the intermittent zone, and bending members having curved contact surfaces movable back and forth transversely of the sprocket chains at the exit of said intermittent zone, so as to forcibly bend slack loops in continuously traveling portions of chains and withdraw corresponding portions of the accumulated slack from the entrance of said intermittent zone, thereby imparting intermittent movements to the portions of the conveyor in the intermittent zone, the contact surface of each bending member being long enough to simultaneously contact with a plurality of said rollers during each of its forcible bending operations.

5. Conveyor apparatus comprising an endless conveyor having a portion which alternately moves and stops and a continuously moving portion, said conveyor being long enough to provide a length of slack, a slack loop bending member pivotally mounted adjacent said conveyor in advance of said alternately movable conveyor portion, another slack loop bending member pivotally mounted adjacent said conveyor trailing said alternately movable conveyor portion, continuously operating conveyor drive means engaging and feeding said conveyor into said first mentioned slack loop bending member, whereby a slack loop is accumulated thereby, said conveyor drive means drawing said conveyor at a substantially constant rate from a slack loop previously accumulated at said second mentioned slack loop bending member through said continuously moving portion, and means connecting said slack loop bending members to cause opposite movement thereof for alternately drawing the slack length of the conveyor through the alternately movable conveyor portion.

6. Conveyor apparatus comprising an endless conveyor having a portion which alternately moves and stops and a continuously moving portion, said conveyor being long enough to provide a slack length, a first slack loop bending member pivotally mounted adjacent said conveyor in advance of said alternately movable portion relative to the direction of movement of the latter, a second slack loop bending member pivotally mounted adjacent said conveyor trailing said alternately movable portion, and continuously operating conveyor drive means engaging said conveyor in advance of said first bending member for continuously drawing said conveyor through said continuously moving portion from the slack loop accumulated at said second bending member and feeding it into said first bending member for accumulation of a slack loop thereby, said slack loop bending members alternately and periodically pivoting across the path of said conveyor in the direction of conveyor movement for drawing the slack length of the conveyor out of said accumulation loop at said first bending member and through said alternately movable portion.

7. Conveying apparatus comprising an endless conveyor having a portion adapted for periodic movement through a predetermined length of travel at each period of movement, said conveyor being long enough to provide a length of slack equal to the length of periodic travel of said conveyor portion, a constantly rotating drive sprocket engaging said conveyor adjacent the entrance to said intermittent conveyor portion, said drive sprocket drawing said conveyor into said conveyor portion, a slack loop accumulating member between said drive sprocket and the entrance to said conveyor portion for accumulating the slack length of said conveyor between periodic movements of said conveyor portion, and a slack loop bending member adjacent the exit of said conveyor portion for periodically drawing the slack length out of said accumulation to effect periodic movement of said conveyor portion.

8. Conveying apparatus comprising an endless conveyor having a portion movable intermittently through a predetermined length of travel, said conveyor being long enough to provide a length of slack substantially equal to the length of travel for said conveyor portion, a constantly rotating drive sprocket engaging said conveyor adjacent the entrance to said conveyor portion for moving said conveyor into said conveyor portion, a slack accumulating member adjacent said drive sprocket engaging said conveyor to bend the latter into a slack loop and prevent conveyor movement in said conveyor portion, and a slack drawing member adjacent the exit of said conveyor portion engaging said conveyor to bend the latter into a loop and draw said conveyor through said conveyor portion from said slack accumulating member, and linkage mechanism interconnecting said members for causing opposite and intermittent movement thereof.

9. Conveying apparatus comprising an endless conveyor having a portion movable intermittently through a predetermined length of travel, said conveyor being long enough to provide a length of slack, a first conveyor bending member engaging said conveyor adjacent the entrance of said intermittently movable conveyor portion to accumulate said length of slack and arrest movement into said conveyor portion, a second conveyor bending member engaging said conveyor adjacent the exit of said intermittently movable conveyor portion to draw said length of slack through said conveyor portion and accumulate said slack, linkage mechanism interconnecting said members for causing substantially simultaneous opposite movement thereof to establish the said intermittent movement of said conveyor portion, and constantly rotating drive means engaging said conveyor to move the same at a substantially constant rate from the slack accumulated by said second member to said first member to reestablish the slack accumulation thereof.

10. Conveyor apparatus comprising a conveyor travelling in a closed course having an intermittently moving portion with inlet and outlet ends, said conveyor being longer than the length of the closed course to provide a length of slack, and conveyor slack moving means adapted to accumulate said length of conveyor slack adjacent the inlet end of the intermittent moving portion of the conveyor and to release the conveyor slack adjacent the outlet end of the same conveyor portion, said conveyor slack regulating means including spaced conveyor slack loop bending members operating simultaneously but in opposite directions to form said length of conveyor slack into a slack loop at the outlet end and to release a similar conveyor slack loop at the inlet end for intermittently drawing said conveyor through said intermittently moving portion.

11. In conveyor apparatus, the combination which includes a flexible conveyor travelling in a closed course and having a length in excess of the length of the closed course to provide a length of slack, rotary supporting means for a span of said conveyor, said rotary supporting means assuming stationary positions along the closed course of said conveyor and being fixed in spaced relation at the inlet and outlet ends of said conveyor span, pivotally movable members adjacent the inlet and outlet of said conveyor span, and operating means connected to said members to concurrently actuate said members in opposite senses to alternately accumulate said conveyor slack length adjacent the inlet of said conveyor span and draw said slack length through said conveyor span to accumulate the same adjacent the outlet of said conveyor span.

12. In conveyor apparatus, the combination which includes a conveyor travelling in a closed course and adapted to have an intermittently moving span therein, rotary conveyor supporting means located in fixed spaced relation to define the inlet and outlet ends of said intermittently moving span, said conveyor having a length in excess of the length of the closed course to provide a slack length, a first conveyor engaging member adjacent said conveyor supporting means at the span inlet and movable about a fixed pivot in a direction across the path of conveyor travel, a second conveyor engaging member adjacent said conveyor supporting means at the span outlet and movable about a fixed pivot in a direction across the path of conveyor travel, and mechanism operably connected to said first and second conveyor engaging members to pivotally operate the latter and intermittently accumulate said conveyor slack length near the inlet, draw the slack length through said span and accumulate the slack length near the outlet for return into the travelling conveyor.

References Cited in the file of this patent

UNITED STATES PATENTS

| Number | Name | Date |
|---|---|---|
| 1,488,251 | House | Mar. 25, 1924 |
| 1,606,166 | Green | Nov. 9, 1926 |
| 1,736,517 | Baker | Nov. 19, 1929 |
| 1,941,597 | Cavagnaro | Jan. 2, 1934 |
| 1,954,349 | Dewey | Apr. 10, 1934 |
| 2,240,214 | Heidelmeyer | Apr. 29, 1941 |
| 2,280,943 | Ferm | Apr. 28, 1942 |
| 2,438,068 | Mercier | Mar. 16, 1948 |
| 2,551,080 | Allen et al. | May 1, 1951 |